US008555151B2

(12) United States Patent
Lucas et al.

(10) Patent No.: US 8,555,151 B2
(45) Date of Patent: *Oct. 8, 2013

(54) METHOD AND APPARATUS FOR COUPLING A VISUAL BROWSER TO A VOICE BROWSER

(75) Inventors: Bruce D. Lucas, Mohegan Lake, NY (US); David E. Reich, Jupiter, FL (US)

(73) Assignee: Nuance Communications, Inc., Burlington, MA (US)

( * ) Notice: Subject to any disclaimer, the term of this patent is extended or adjusted under 35 U.S.C. 154(b) by 926 days.

This patent is subject to a terminal disclaimer.

(21) Appl. No.: 12/694,498

(22) Filed: Jan. 27, 2010

(65) Prior Publication Data
US 2010/0293446 A1    Nov. 18, 2010

Related U.S. Application Data

(60) Continuation of application No. 11/422,128, filed on Jun. 5, 2006, now Pat. No. 7,657,828, which is a division of application No. 09/605,612, filed on Jun. 28, 2000, now Pat. No. 7,080,315.

(51) Int. Cl.
*G06F 17/00* (2006.01)

(52) U.S. Cl.
USPC ........................................ 715/205; 715/201

(58) Field of Classification Search
USPC ........................................ 715/201, 205, 744
See application file for complete search history.

(56) References Cited

U.S. PATENT DOCUMENTS

| 5,748,186 | A | 5/1998 | Raman |
| 5,983,200 | A | 11/1999 | Slotznick |
| 6,018,710 | A | 1/2000 | Wynblatt et al. |
| 6,057,856 | A | 5/2000 | Miyashita et al. |
| 6,088,032 | A * | 7/2000 | Mackinlay .................... 715/848 |
| 6,088,675 | A | 7/2000 | MacKenty et al. |
| 6,125,376 | A * | 9/2000 | Klarlund et al. .............. 715/205 |
| 6,145,003 | A * | 11/2000 | Sanu et al. .................... 709/225 |
| 6,230,172 | B1 * | 5/2001 | Purnaveja et al. ............ 715/205 |

(Continued)

OTHER PUBLICATIONS

Han et al., WebSplitter: A Unified XML Framework for Multi-Device Collaborative Web Browsing, ACM 2000, pp. 221-230.*

(Continued)

*Primary Examiner* — Cong-Lac Huynh
(74) *Attorney, Agent, or Firm* — Wolf, Greenfield & Sacks, P.C.

(57) ABSTRACT

A method and apparatus for concurrently accessing network-based electronic content in a Voice Browser and a Visual Browser can include the steps of retrieving a network-based document formatted for display in the Visual Browser; identifying in the retrieved document a reference to the Voice Browser, the reference specifying electronic content formatted for audible presentation in the Voice Browser; and, transmitting the reference to the Voice Browser. The Voice Browser can retrieve the specified electronic content and audibly present the electronic content. Concurrently, the Visual Browser can visually present the network-based document formatted for visual presentation in the Visual Browser. Likewise, the method of the invention can include the steps of retrieving a network-based document formatted for audible presentation in the Voice Browser; identifying in the retrieved document a reference to the Visual Browser, the reference specifying electronic content formatted for visual presentation in the Visual Browser; and, transmitting the reference to the Visual Browser. The Visual Browser can retrieve the specified electronic content and visually present the specified electronic content. Concurrently, the Voice Browser can audibly present the network-based document formatted for audible presentation in the Voice Browser.

6 Claims, 3 Drawing Sheets

(56) References Cited

U.S. PATENT DOCUMENTS

| | | | | |
|---|---|---|---|---|
| 6,247,013 | B1* | 6/2001 | Morimoto | 709/203 |
| 6,282,511 | B1* | 8/2001 | Mayer | 704/270 |
| 6,349,132 | B1 | 2/2002 | Wesemann et al. | |
| 6,449,653 | B2* | 9/2002 | Klemets et al. | 709/231 |
| 6,606,611 | B1 | 8/2003 | Khan | |
| 6,616,700 | B1 | 9/2003 | Thum et al. | |
| 6,636,831 | B1* | 10/2003 | Profit et al. | 704/275 |
| 6,654,931 | B1 | 11/2003 | Haskell et al. | |
| 6,697,564 | B1* | 2/2004 | Toklu et al. | 386/285 |
| 6,711,714 | B1* | 3/2004 | Wynblatt et al. | 715/209 |
| 6,732,142 | B1 | 5/2004 | Bates et al. | |
| 6,745,163 | B1* | 6/2004 | Brocious et al. | 704/260 |
| 6,922,733 | B1 | 7/2005 | Kuiken et al. | |
| 6,983,307 | B2 | 1/2006 | Mumick et al. | |
| 7,032,169 | B2 | 4/2006 | Ativanichayaphong et al. | |
| 7,058,695 | B2* | 6/2006 | Takagi et al. | 709/217 |
| 7,062,437 | B2* | 6/2006 | Kovales et al. | 704/260 |
| 7,093,129 | B1* | 8/2006 | Gavagni et al. | 713/175 |
| 7,116,765 | B2* | 10/2006 | Summers et al. | 379/88.17 |
| 8,448,059 | B1* | 5/2013 | Dodrill et al. | 715/205 |
| 2001/0034746 | A1 | 10/2001 | Tsakiris et al. | |
| 2002/0065944 | A1 | 5/2002 | Hickey et al. | |
| 2002/0082922 | A1* | 6/2002 | Van Zoest et al. | 705/14 |
| 2002/0178182 | A1* | 11/2002 | Wang et al. | 707/501.1 |
| 2002/0184373 | A1 | 12/2002 | Maes | |
| 2003/0046346 | A1 | 3/2003 | Mumick et al. | |
| 2003/0164848 | A1 | 9/2003 | Dutta et al. | |
| 2003/0221158 | A1* | 11/2003 | Ativanichayaphong et al. | 715/500 |
| 2004/0083236 | A1 | 4/2004 | Rust | |
| 2005/0021862 | A1* | 1/2005 | Schroeder et al. | 709/246 |

OTHER PUBLICATIONS

Barbara et al., "The AudioWeb," ACM 1997, pp. 97-104.
Hamberg et al., "GUI Navigation in Embedded Automotive Systems," http://www.tradespeak.com/htlmdocs/2030.htm. (Tradespeak 2000).
Muller et al., "Toward a Definition of Voice Documents," ACM 1990, pp. 174-183.
Petrucci et al., "WebSound: a General Web Sonification Tool, and Its Application to an Auditory Web Browser for Blind and Visually Impaired Users," Google 2000, pp. 1-4.
Tzanetakis et al., "Marsyas3D: A Prototype Audio Browser-Editor Using a Large Scale Immerse Visual and Audio Display," Google Aug. 2001, pp. 1-5.
Version 1.0 of the VoiceXML Specification, published by the VoiceXML Forum by Linda Boyer et al., Voice eXtensible Markup Language (Voice XML) Version 1.0 (W3C May 2000).

* cited by examiner

METHOD AND APPARATUS FOR COUPLING A VISUAL BROWSER TO A VOICE BROWSER

RELATED APPLICATIONS

This application is a continuation application of U.S. application Ser. No. 11/422,128, filed Jun. 5, 2006, entitled "METHOD AND APPARATUS FOR COUPLING A VISUAL BROWSER TO A VOICE BROWSER," which is a divisional application of U.S. application Ser. No. 09/605,612, filed Jun. 28, 2000, now U.S. Pat. No. 7,080,315, entitled "METHOD AND APPARATUS FOR COUPLING A VISUAL BROWSER TO A VOICE BROWSER," both of which applications are incorporated herein by reference in their entirety.

BACKGROUND OF THE INVENTION

1. Technical Field

This invention relates to browsing network-based electronic content and more particularly to a method and apparatus for coupling a visual browser to a voice browser.

2. Description of the Related Art

Visual Browsers are applications which facilitate visual access to network-based electronic content provided in a computer communications network. One type of Visual Browser, the Web Browser, is useful for locating and displaying network-based electronic content formatted using Hyper-Text Markup Language ("HTML"). Two popular Web Browsers are Netscape® Navigator® and Microsoft® Internet Explorer®. Notably, the term "Visual Browser" denotes that the browser can display graphics, text or a combination of graphics and text. In addition, most Visual Browsers can present multimedia information, including sound and video, although some Visual Browsers can require plug-ins in order to support particular multimedia information formats.

Whereas typical Visual Browsers operate in the desktop environment, compressed HTML ("C-HTML") Visual Browsers have emerged for processing HTML formatted documents in low-bandwidth environments. Specifically, C-HTML formatted documents are HTML formatted documents which have been compressed prior to transmission. C-HTML compliant Visual Browsers can decompress C-HTML formatted documents prior to displaying the same. Exemplary C-HTML Visual Browsers have been implemented for the QNX® Neutrino® operating system manufactured by QNX Software Systems, Ltd. of Kanata, Ontario.

A Voice Browser, unlike a Visual Browser, does not permit a user to interact with network-based electronic content visually. Rather, a Voice Browser, which can operate in conjunction with a Speech Recognition Engine and Speech Synthesis Engine, can permit the user to interact with network-based electronic content audibly. That is, the user can provide voice commands to navigate from network-based electronic document to document. Likewise, network-based electronic content can be presented to the user audibly, typically in the form of synthesized speech. Thus, Voice Browsers can provide voice access and interactive voice response to network-based electronic content and applications, for instance by telephone, personal digital assistant, or desktop computer.

Significantly, Voice Browsers can be configured to interact with network-based electronic content encoded in VoiceXML. VoiceXML is a markup language for distributed voice applications based on extended markup language ("XML"), much as HTML is a markup language for distributed visual applications. VoiceXML is designed for creating audio dialogs that feature synthesized speech, digitized audio, recognition of spoken and Dual Tone Multifrequency ("DTMF") key input, recording of spoken input, telephony, and mixed-initiative conversations. Version 1.0 of the VoiceXML specification has been published by the VoiceXML Forum in the document Linda Boyer, Peter Danielsen, Jim Ferrans, Gerald Karam, David Ladd, Bruce Lucas and Kenneth Rehor, *Voice eXtensible Markup Language (VoiceXML™) version 1.0*, (W3C May 2000), incorporated herein by reference. Additionally, Version 1.0 of the VoiceXML specification has been submitted to and accepted by the World Wide Web Consortium by the VoiceXML Forum as a proposed industry standard.

Notably, the capabilities of Visual Browsers have not been combined with the capabilities of Voice Browsers such that a user of both can interact with network-based electronic content concurrently. That is, to date no solution has been provided which permits a user to interact with network-based visual content in a Visual Browser while also interacting with network-based audio content in a Voice Browser. Present efforts to provide a browser which can interact with network-based visual and audio content have been confined to the coding of speech synthesis functionality into an existing Visual Browser to produce a speech-aware Visual Browser. In addition, new speech-related markup tags for Visual Browsers have been proposed in order to provide speech functionality to a Visual Browser.

Still, these solutions require the implementer to develop a speech-aware function set for handling network-based speech content and to integrate the same directly in the source code of the Visual Browser. In consequence, the development of speech-related functionality is tightly linked to the development of the remaining functionality of the Visual Browser. Finally, the tight integration between the Visual Browser and the speech-aware functionality precludes the user from using a separate, more robust and efficient Voice Browser having a set of functions useful for interacting with network-based speech content. Hence, what is needed is a method and apparatus for coupling a visual browser to a voice browser so that the combination of the visual browser and the voice browser can perform concurrent visual and voice browsing of network-based electronic content.

SUMMARY OF THE INVENTION

The present invention is a method and apparatus for concurrently accessing network-based electronic content in a Voice Browser and a Visual Browser. The method can include the steps of retrieving a network-based document formatted for display in the Visual Browser; identifying in the retrieved document a reference to the Voice Browser, the reference specifying electronic content formatted for audible presentation in the Voice Browser; and, transmitting the reference to the Voice Browser. The Voice Browser can retrieve the specified electronic content and audibly present the electronic content. Concurrently, the Visual Browser can visually present the network-based document formatted for visual presentation in the Visual Browser.

In a preferred embodiment of the present invention, the network-based document formatted for visual presentation in the Visual Browser can be an HTML document and the Visual Browser can be a Web Browser. Likewise, the electronic content formatted for audible presentation in the Voice Browser can be VoiceXML formatted electronic content. In the case where the network-based document is an HTML document, the reference can be a coordination markup attribute.

Significantly, the reference can specify a network-based document containing the electronic content formatted for audible presentation in the Voice Browser. Consequently, the Voice Browser can retrieve the specified network-based document through the computer communications network and audibly present the electronic content contained in the specified network-based document, while the Visual Browser can visually present the network-based document formatted for visual presentation.

In an alternative embodiment, a method for concurrently accessing network-based electronic content in a Voice Browser and a Visual Browser can include the steps of retrieving a network-based document formatted for audible presentation in the Voice Browser; identifying in the retrieved document a reference to the Visual Browser, the reference specifying electronic content formatted for visual presentation in the Visual Browser; and, transmitting the reference to the Visual Browser. The Visual Browser can retrieve the specified electronic content and visually present the specified electronic content. Concurrently, the Voice Browser can audibly present the network-based document formatted for audible presentation in the Voice Browser.

More particularly, the network-based document formatted for audible presentation in the Voice Browser can be a VoiceXML document. Moreover, the electronic content formatted for visual presentation in the Visual Browser can be HTML formatted electronic content and the Visual Browser can be a Web Browser. Significantly, the reference can specify a network-based document containing the electronic content formatted for visual presentation in the Visual Browser. In that case, the Visual Browser can retrieve the specified network-based document through the computer communications network and visually present the electronic content contained in the network-based document, while the Voice Browser can audibly present the network-based document formatted for audible presentation.

A multi-modal browser for performing the method of the invention can include a Visual Browser for visually presenting visual content retrieved from a computer communications network, a Voice Browser for audibly presenting voice content retrieved from the computer communications network, and a Coupling Interface for synchronizing the visual and audible presentation of the visual and voice content in each of the respective Visual and Voice Browsers. Notably, the visual content can be HTML formatted content and the voice content can be VoiceXML formatted content.

Additionally, the multi-modal browser can include a Time Critical Event Handler. The Time Critical Event Handler can listen for time critical content, identify in the time critical content a content-type indicator, forward the time critical content to the Visual Browser if the content-type indicator indicates visual content, and forward the time critical content to the Voice Browser if the content-type indicator indicates voice content.

A method for modifying a network-based document for supporting concurrent access to network-based voice and visual content in a Voice Browser and a Visual Browser can include the steps of incorporating visual content in a network-based document; formatting the network-based document for visual presentation in a Visual Browser; and, inserting at least one markup tag in the network-based document. The markup tag can contain a coordination markup attribute specifying a network-based document formatted for audible presentation in a Voice Browser. As a result, the Visual Browser when rendering the network-based document formatted for visual display can identify the coordination markup attribute in the markup tag and can transmit a reference to the specified network-based document to the Voice Browser. Consequently, the Voice Browser can retrieve the specified network-based document and audibly present the specified network-based document concurrently with the visual presentation of the network-based document formatted for visual presentation in the Visual Browser. In the preferred method, the network based document formatted for visual presentation in a Visual Browser can be an HTML formatted document and the Visual Browser can be a Web Browser. Also, the network based document formatted for audible presentation in a Voice Browser can be a VoiceXML formatted document and the Voice Browser can be a VoiceXML Browser.

A method for modifying a network-based document for supporting concurrent access to network-based voice and visual content in a Voice Browser and a Visual Browser can also include the steps of: incorporating voice content in a network-based document; formatting the network-based document for audible presentation in a Voice Browser; and, inserting at least one markup tag in the network-based document. The markup tag can contain a coordination markup attribute specifying a network-based document formatted for visual presentation in a Visual Browser. As such, the Voice Browser when rendering the network-based document formatted for audible display can identify the coordination markup attribute in the markup tag and can transmit a reference to the specified network-based document to the Visual Browser. In consequence, the Visual Browser can retrieve the specified network-based document and visually present the specified network-based document concurrently with the audible presentation of the network-based document formatted for audible presentation in the Voice Browser. In a preferred embodiment of the method, the network based document formatted for visual presentation in a Visual Browser can be an HTML formatted document and the Visual Browser can be a Web Browser. Also, the network based document formatted for audible presentation in a Voice Browser can be a VoiceXML formatted document and the Voice Browser can be a VoiceXML Browser.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a method and apparatus for coupling a Visual Browser and a Voice Browser so that both can concurrently access network-based electronic content in a computer communications network in a coordinated and complementary fashion. The method and apparatus of the invention provide for a multi-modal aspect in consequence of which the functions of visual and voice browsing can be synchronized without developing a new, separate hybrid browser and without having to code new speech handling methods directly into existing visual browsers. Rather, an independent Visual Browser can be coupled to an independent Voice Browser through a reference embedded in a network-based document retrievable by the Visual Browser. Conversely, an independent Voice Browser can be coupled to an independent Visual Browser through a reference embedded in a network-based document retrievable by the Voice Browser. In both cases, existing tags defined by existing markup languages are utilized rather than the modification of browser functionality in order to facilitate the coupling of the Voice Browser and the Visual Browser.

In the preferred embodiment, a network-based document formatted for display in a Visual Browser can be retrieved from a source in the computer communications network. A reference to a Voice Browser can be identified in the retrieved document in which the reference specifies electronic content formatted for audible presentation in the Voice Browser. Subsequently, the reference can be transmitted to the Voice Browser. Responsive to receiving the transmitted reference, the Voice Browser can extract therefrom the specified electronic content and audibly present the electronic content while the Visual Browser concurrently visually presents the electronic content contained in the network-based document.

Figure 1:
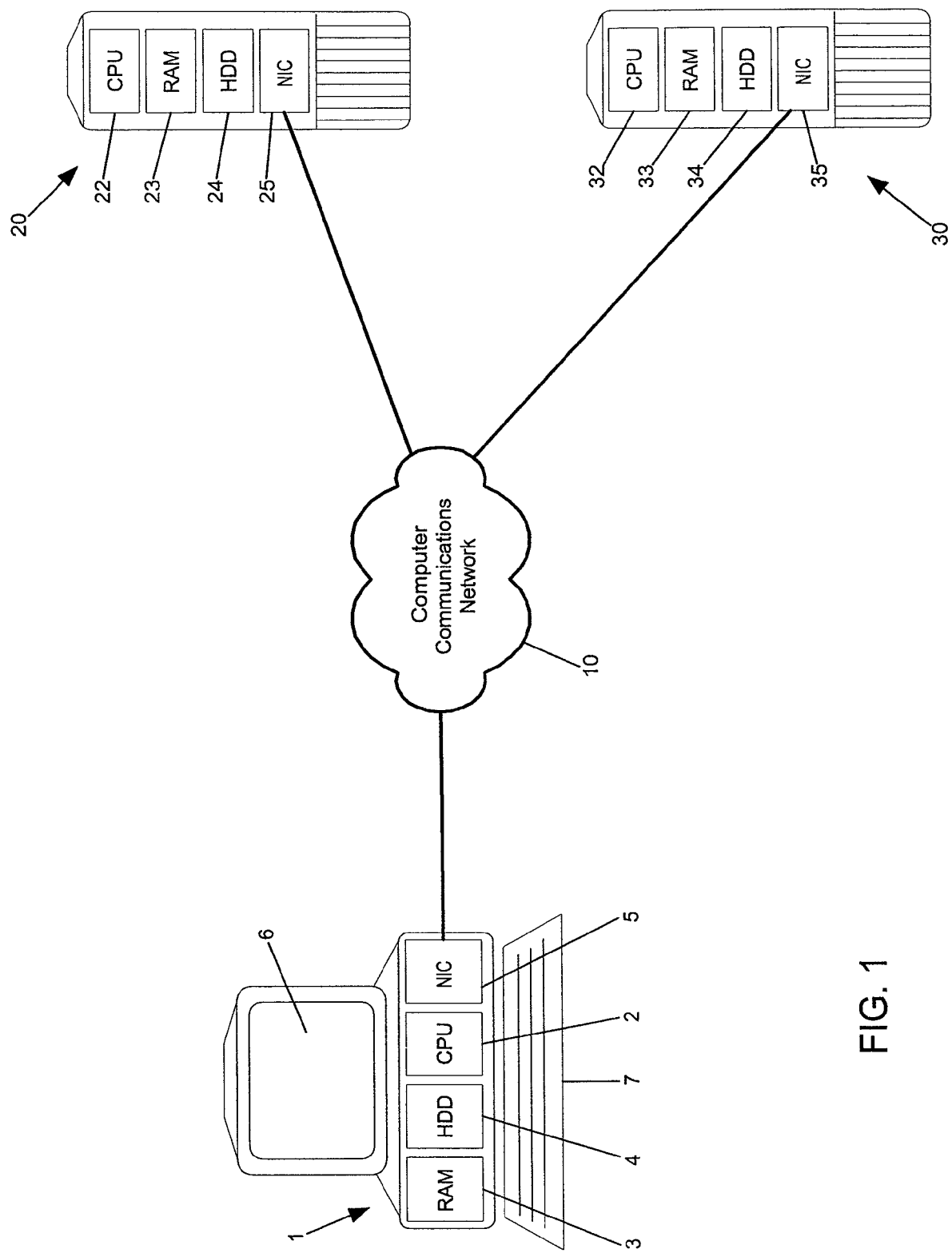
FIG. 1 is a schematic representation of a server computer system supplying electronic content formatted for visual presentation in a Visual Browser in a client computer system, and a server computer system supplying electronic content formatted for audible presentation in a Voice Browser in the client computer system.

FIG. 1 illustrates a network environment in which the method of the invention can be performed. This network environment comprises a computer communications network 10 interconnecting a client computers 1 and servers 20, 30 where the servers 20, 30 include at least one voice content server and at least one visual content server. Significantly, the invention is not limited in regard to the number of server computers required to provide the client computer 1 with network-based voice content and network-based visual content. In fact, in one embodiment of the present invention, a single server computer can provide both voice and visual content to the client computer 1. Still, a server computer separately providing voice and visual electronic content to requesting client computers are shown for ease of illustration and discussion.

The computer communications network 10 can be any non-publicly accessible network such as a LAN (local area network) or WAN (wide area network), or preferably, the Internet. In operation, the client computer 1 can establish a connection with server computers 20, 30 in order to transmit a request for electronic content stored in the server computers 20, 30. Each server computer 20, 30 can reply to the request by supplying the requested electronic content to the client computer 1. Notably, the electronic content can be formatted for visual presentation in a Visual Browser or audible presentation in a Voice Browser.

In the preferred embodiment, the electronic content formatted for visual presentation in a Visual Browser is an HTML formatted electronic content which can be displayed in a Web Browser. Similarly, in the preferred embodiment, the electronic content formatted for audible presentation in a Voice Browser is VoiceXML formatted electronic content. Still, the invention is not limited to the particular method of formatting the electronic content. Rather, any suitable method for formatting visual electronic content and audible electronic content can suffice. Examples of suitable alternative visual formatting methods can include C-HTML, XML, SGML, VRML, etc. Similarly, examples of suitable alternative audible presentation methods can include WAV, MPEG, AIFF, etc.

As shown in FIG. 1, the client computer 1 preferably has a central processing unit (CPU) 2, an internal memory device 3 such as a random access memory (RAM), and a fixed storage 4 such as a hard disk drive (HDD). The client computer 1 also includes network interface circuitry (NIC) 5 for communicatively connecting the client computer 1 to the computer communications network 10. Optionally, the client computer 1 can further include a keyboard 7 and at least one user interface display unit 6 such as a video display terminal (VDT) operatively connected thereto for the purpose of interacting with the client computer 1. For the purposes of rendering the voice content, the client computer 1 need not even have the keyboard 7, a mouse or display unit 6 as they are unnecessary for interacting with a user through voice. Additionally, the client computer 1 that interacts audibly with the user can contain audio circuitry, a speaker and a microphone (not shown). Further, the client computer 1 need not be a personal computer as illustrated in FIG. 1. Rather, the client computer 1 can be any computing device containing such audio circuitry and enabled to communicate with the computer communications network 10 in order to perform the methods of the invention.

Like the client computer 1, server computers 20, 30 preferably have CPUs 22, 32, internal memory devices 23, 33, and fixed storage 24, 34. Each server computer 20, 30 also includes network interface circuitry (NIC) 25, 35 for communicatively connecting the server computers 20, 30 to the computer communications network 10. Unlike the client computer 1, the server computers 20, 30 need not include a keyboard or video display terminal inasmuch as the server computers can interact with users over a network. In the preferred embodiment, server computer 20 can provide to the client computer 1 visual content for display in a Visual Browser residing in the client computer 1. Concurrently, server computer 30 can provide to the client computer 1 voice content for audible presentation in a Voice Browser in the client computer 1. Still, the invention is not limited in the precise number of server computers supplied to provide electronic content to the client computer 1. Rather, in an alternative embodiment, both the visual content and the voice content can be provided to the client computer 1 by a single server computer.

Figure 2:
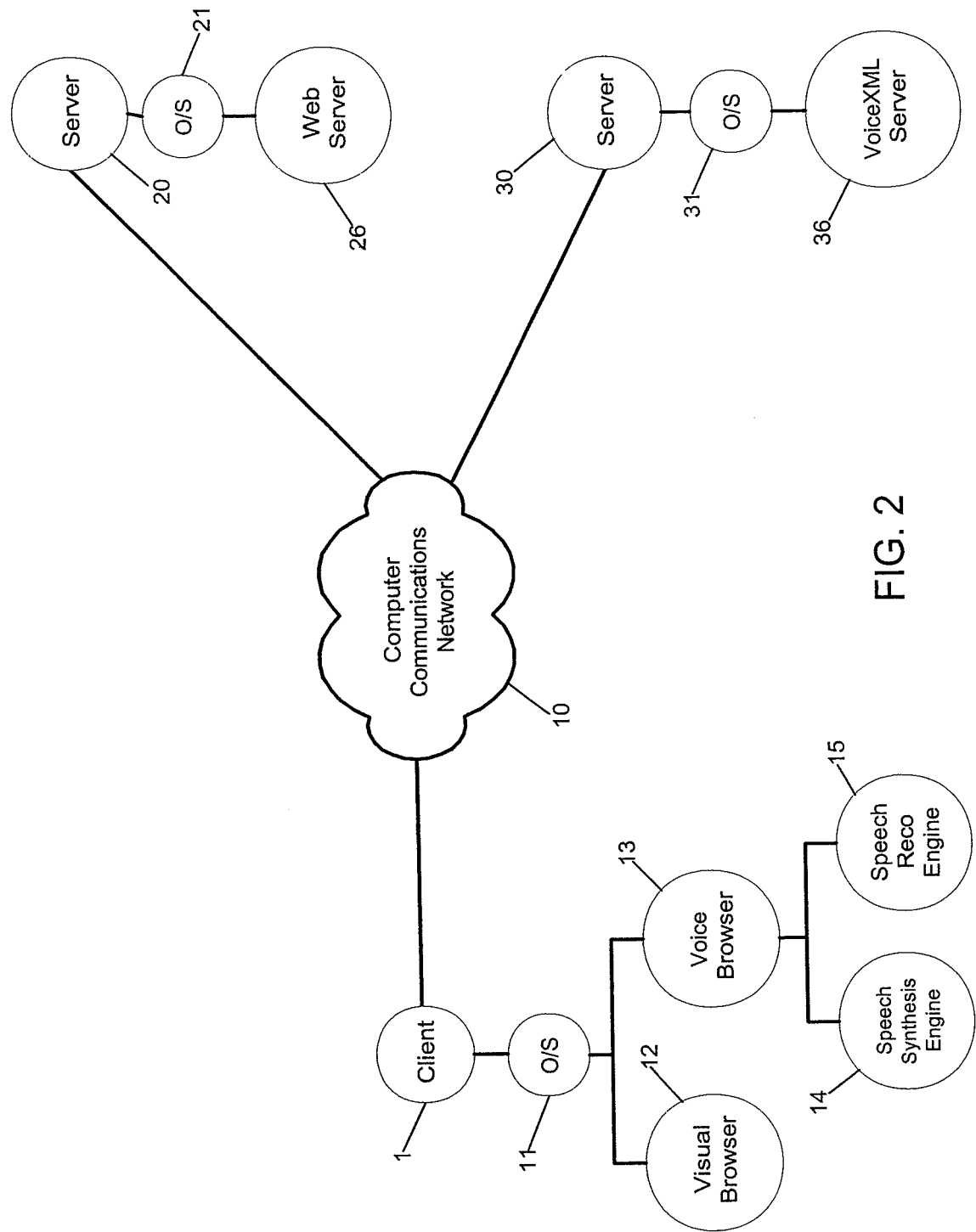
FIG. 2 is a hierarchical illustration of an architecture suitable for use in the network of FIG. 1 in which the client computer system can couple a Visual Browser and a Voice Browser so that both can concurrently access network-based electronic content in the network.

Turning now to FIG. 2, a hierarchical illustration of an architecture suitable for use in the network of FIG. 1 is shown in which the client computer 1 can couple a Visual Browser 12 and a Voice Browser 13 so that both can concurrently access network-based electronic content in servers 20, 30 residing in the computer communications network 10. As shown in FIG. 2, each of the server computers 20, 30 can include an operating system 21, 31 upon which applications can execute. As is well-known in the art, the operating system 21, 31 can be used to provide network communications to an application executing thereon.

The server computer 20 can include a server application for responding to requests for visually presentable electronic content. More particularly, the server application can provide requested electronic content in response to received requests. In the preferred embodiment, the server application is a Web Server 26 which can provide HTML formatted content to requesting computers communicatively connected to the computer communications network 10. Specifically, the HTML formatted content can be static HTML Web pages stored in the server computer 20, or dynamically formatted HTML Web pages created dynamically in response to received requests. Alternatively, the HTML formatted content can be a compressed HTML document.

Similarly, the server computer 30 can include a server application for responding to requests for audibly presentable electronic content. More particularly, like the Web Server 26 of server computer 20, the server application of server computer 30 can provide requested electronic content in response to received requests. In the preferred embodiment, the server application is a VoiceXML Server 36 which can provide VoiceXML formatted content to requesting computers communicatively connected to the computer communications network 10. Specifically, the VoiceXML formatted content can be static VoiceXML documents stored in the server computer 30, or dynamically formatted VoiceXML documents created dynamically in response to received requests.

In the preferred embodiment, the client computer 1 can include an operating system 11, for example QNX Neutrino, upon which applications can load and execute. Two such preferred applications can include a Visual Browser 12 and a Voice Browser 13. The Visual Browser 12, for instance a Web Browser, can accept user requests for Web content in the Web server 26 communicatively connected to the computer communications network 10. In response, the Visual Browser 12 can transmit to the Web server 26 the request using the Hyper-Text Transfer Protocol ("HTTP"). The Web server 26 can receive the request and can transmit the requested Web content to the Visual Browser 12. Similarly, the Voice Browser 13 can accept user requests for VoiceXML content in the VoiceXML Server 36 communicatively connected to the computer communications network 10. Notably, the user requests can be speech recognized by the speech recognition engine 15. In response, the Voice Browser 13 can transmit to the VoiceXML Server 36 the speech recognized request also using HTTP. The Voice Server 36 can receive the request and can transmit the requested VoiceXML content to the Voice Browser 13. Subsequently, the audibly presentable electronic content in the VoiceXML page can be audibly presented to the user by way of speech synthesis engine 14. In this way, a user of client computer 1 can both view visual content using a Visual Browser 12 and hear voice content using a Voice Browser 13.

Significantly, a user of client computer 1 can "co-browse" both visual and voice content provided by the Web Server 26 and VoiceXML Server 36, respectively. That is, the visual content browsing of the Visual Browser 12 can be synchronized with the voice content browsing of the Voice Browser 13 by coupling the visual browsing functionality of the Visual Browser 12 to the voice browsing functionality of the Voice Browser 13. This coupling can be accomplished without requiring the design and implementation of a hybrid content browser. Rather, the Visual Browser 12 can be coupled to the Voice Browser 13 by means of coordination markup attributes contained in existing markup tags included as part of the HTML and VoiceXML specification.

In particular, in the preferred embodiment HTML formatted content and VoiceXML formatted content can include "co-target" type tags designed to reference other browsers. Specifically, in an HTML formatted document, an anchor reference markup tag containing an "href" can be used to specify target Web content to be loaded when a user selects the anchor reference. Typically, the target Web content is specified by a uniform resource locator ("URL") specified in the href. In the preferred embodiment, a co-target specifying VoiceXML content, known as a "cohref", can be embedded in the anchor reference in addition to the target Web content. An example of a co-target specified by a cohref follows:

```
<HTML>
    <HEAD>
        <TITLE>SBU CoBrowsing Demo</TITLE>
    </HEAD>
    <BODY LEFTMARGIN="0" TOPMARGIN="0">
        <A HREF="mainmenu.html" cohref="mainmenu.vxml">
        <IMG SRC="splashscreen.jpg" WIDTH="314"
        HEIGHT="200"/></A>
    </BODY>
</HTML>
```

As shown in the above example, the hyperlink specified by the anchor markup includes a reference both to a target Web page specified by "mainmenu.html" and a co-target VoiceXML document specified by "mainmenu.vxml". When the Visual Browser 12 encounters this hyperlink, the Visual Browser 12 can request from the Web Server 26 the Web page "mainmenu.html". Additionally, the Visual Browser 12 can identify the co-target reference and can transmit the reference to the Voice Browser 13. The Visual Browser 12 can transmit the reference to the Voice Browser 13 using the visit( )method contained in the published applications programming interface ("API") of the Voice Browser 13. In response, the Voice Browser 13 can request from the VoiceXML Server 36 the VoiceXML document "mainmenu.vxml".

Correspondingly, in a VoiceXML formatted document, a "choice next" markup tag can be used to specify target VoiceXML content to be loaded when a user vocally selects a particular choice in the VoiceXML document. Typically, the target VoiceXML content is specified by a uniform resource locator ("URL") specified in the choice next tag. In the preferred embodiment, a "conext" attribute specifying Web content can be embedded in the choice next tag in addition to the target VoiceXML content. An example of a choice next tag incorporating a conext attribute follows:

```
<vxml version="1.0">
    <form name="Welcome">
        <block>Welcome to the CoBrowsing Demo!
            <goto next="#1"/>
        </block>
    </form>
    <menu id="1">
        <prompt>Say test to authenticate user.</prompt>
        <grammar type="text/jsgf">
            continue
        </grammar>
        <choice next="mainmenu.vxml" conext="mainmenu.html">
            test
        </choice>
    </menu>
</vxml>
```

As shown in the above example, the hyperlink specified by the next tag includes a reference both to a target VoiceXML document specified by "mainmenu.vxml" and a co-target Web page specified by "mainmenu.html". When the Voice Browser 13 encounters this next, the Voice Browser 13 can request from the Voice Server 36 the VoiceXML document "mainmenu.vxml". Additionally, the Voice Browser 13 can identify the conext reference and can transmit the reference to the Visual Browser 12. The Voice Browser 13 can transmit the reference to the Voice Browser 12 using a published API function call of the Visual Browser 12 for requesting a Web page by the URL of the Web page, for example the HTTP "Open" function. The Visual Browser 12, in turn, can request from the Web Server 26 the Web page "mainmenu.html".

Significantly, the present invention is not limited merely to the href and conext coordination markup attributes. Rather, a number of coordination markup attributes are available for use in the Visual Browser 12 and the Voice Browser 13 for coordinating the actions of the Visual Browser 12 with the actions of the Voice Browser 13. More particularly, the attributes can be divided into two categories. First, attributes can reflect actions which occur at the source of an event, such as choosing a voice menu item, completing a voice form, or clicking on a visual link or button. Second, attributes can reflect actions which occur at the destination of an event, such as visiting a voice body, menu or form, or displaying a visual document or anchor within a document. Notably, with regard to the Visual Browser 13, coordination markup attributes can be defined which are not a standard part of the HTML specification. In consequence, those non-standard attributes can be defined in a customizable visual browser having a corresponding augmented tag attribute set. In the preferred embodiment, the following table presents preferred coordination markup attributes for use in the Visual Browser 12 and the Voice Browser 13 of the present invention:

|  | At Source | At Destination |
|---|---|---|
| Speech Browser | <goto next="URL" conext="URL"> <choice next="URL" conext="URL"> <form action="URL" coaction="URL"> | <menu covisit="URL"> <form covisit="URL"> |
| Visual Browser | <a href="URL" cohref="URL"> <form action="URL" coaction="URL"> | <body covisit="URL"> <form covisit="URL"> <a id="id" covisit="URL"> |

With regard to the Speech Browser 13, "conext" specifies the URL for the Visual Browser 12 to display when an associated voice-specified goto or menu choice is selected by a user. "Coaction" specifies the URL for the Visual Browser 12 to display when an associated voice form is completed. Finally, "covisit" specifies the URL for the Visual Browser 12 to visit when an associated voice element is visited. Similarly, with regard to the Visual Browser 12, "cohref" specifies the URL for the Voice Browser 13 to visit when an associated visual link or button is selected. "Coaction" specifies the URL for the Voice Browser 13 to visit when an associated visual form is submitted. Finally, "covisit" specifies the URL for the Voice Browser 13 to visit when an associated visual document is loaded or a visual anchor is displayed.

Notably, both the visual and voice content can be included in a single, composite network-based document. In the case of a composite network-based document, both the Voice Browser 13 and the Visual Browser 12 can parse the composite document and present content contained therein which is suitable for display in the respective browser. Additionally, each of the Voice Browser 13 and the Visual Browser 12 can identify in the composite document, respective cohref and conext specified electronic content. As example of a composite document follows:

```
<HTML>
    <HEAD><TITLE>SBU Embedded Markup
    CoBrowsing Demo</TITLE></HEAD>
    <vxml version="1.0">
        <form name="Welcome">
            <block>Welcome to the SBU Multi-modal Browser Demo!
```

```
            <goto next="#1"/>
        </block>
    </form>
    <menu id="1">
        <prompt>Say test to authenticate user.</prompt>
        <grammar type="text/jsgf">
            continue
        </grammar>
        <choice next="mainmenu.vxml"
            conext="mainmenu.html">
            test
        </choice>
    </menu>
</vxml>
<BODY LEFTMARGIN="0" TOPMARGIN="0">
    <A HREF="mainmenu.html" cohref="mainmenu.vxml">
        <IMG SRC="splashscreen.jpg" WIDTH="314"
            HEIGHT="200"/>
    </A>
</BODY>
</HTML>
```

Figure 3:
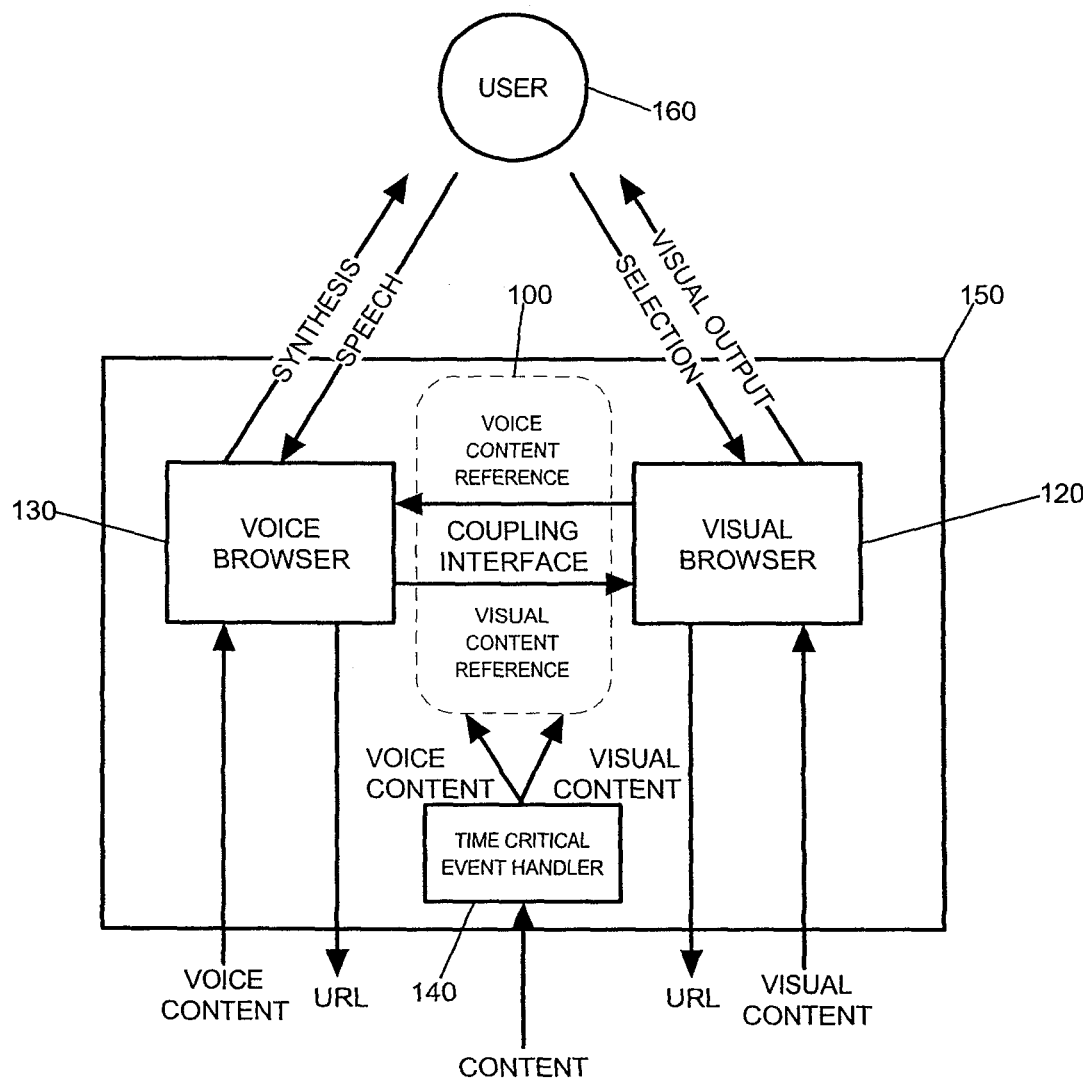
FIG. 3 is a multi-modal browser architecture for implementing the method of the invention.

FIG. 3 illustrates a multi-modal browser 150 for implementing the method of the invention. As will be apparent from the figure, a multi-modal browser 150 in accordance with the inventive arrangements can include three distinct components: a Visual Browser 120, a Voice Browser 130, and a Coupling Interface 100 for coupling the Voice Browser 130 to the Visual Browser 120 by managing the synchronization between each browser. Additionally, the multi-modal browser 150 can include a Time Critical Event Handler 140 for processing time critical information such as status information. Significantly, the Visual Browser 120 and Voice Browser 130 components are independent. Each interprets its own markup stream to present independent, but complementary information to a user 160. In accordance with the method of the invention, the browsers can interact with one another through the Coupling Interface 100.

In the preferred embodiment of the multi-modal browser 150, the Visual Browser 120 is a Java-based Micro Browser designed for execution in an embedded environment. The Micro Browser can be implemented using VisualAge® for Embedded Systems® manufactured by IBM Corporation of Armonk, N.Y. VisualAge for Embedded Systems supplements the Java user interface support with Degas® display technology. In particular, Degas is a Java-based development environment used for building GUI embedded applications for execution in the QNX Neutrino embedded operating system. Degas can be used to create screen displays having unique graphical views and a realistic 3D look-and-feel. Specifically, a developer utilizing the Degas framework can construct the visual elements for a target device, subclass the classes that implement those elements, and prototype a GUI interface using those elements.

The Micro Browser can extend the Degas DefaultApplication class and implements an HTML View/Controller pair as an extension of the Degas DefaultView and DefaultController classes, respectively. The HTML Controller can pass user events from the display to the Micro Browser application, which in turn can update the HTML View. A more detailed discussion of the Degas framework can be found in Kerri Ann Hamberg and Brian Neal, *GUI Navigation in Embedded Automotive Systems*, http://www.tradespeak.com/htmldocs/2030.html (tradespeak 2000), incorporated herein by reference.

As shown in FIG. 3, another multi-modal browser 150 component is the Time Critical Event Handler 140. The Time Critical Event Handler 140 can listen on an IP port for markup which can be forwarded to either the Visual Browser 120, the Voice Browser 130, or both via the Coupling Interface 100. The markup corresponds to time critical information (referred to as status information) which may interrupt the current application. In order to determine which browser should display the status information, the markup preferably includes a content-type, or MIME type, placed at the head of the document containing the markup. According to convention, two blank lines follow the content-type above either the beginning HTML or VXML document tag. In the preferred embodiment, markup having status information which is received in the multi-modal browser 150 preferably has a content-type of VXML, CHTML, or EVXML.

In operation, based on a user's interaction with voice or visual content, the user 160 can navigate to a new location. As each browser transitions from one URL to another, the browser can coordinate browsing with the other browser via coordination markup attributes added to the respective markup languages. These element attributes can direct the browser to notify the other browser when to visit a complementary URL ("co-URL"). For example, when the user 160 selects a link in the Visual Browser 120, the Visual Browser 120 visits the URL of the visual page specified by the link. To direct the Voice Browser 130 to visit the corresponding voice page, an application developer can add a covisit attribute containing the URL of the desired voice page to the HTML anchor or form tag in the visual page. Similarly, when the user 160 selects a link in the Voice Browser 130, the Voice Browser visits the URL of the voice page specified by the link. To direct the Visual Browser 120 to visit the corresponding visual page, the application developer can add a comenu, coform, or conext attribute containing the URL of the desired visual page to the VXML tag in the voice page.

Thus each browsing component (voice and visual) can interpret its own markup stream and make its own transition from one document or document element (URL) to another document or document element. The document elements contain markup attributes that synchronize the transitions of each browser to the other, at points chosen by the application designer.

Thus, coordination markup attributes, for example cohref and conext tags, can be used to couple a Visual Browser to a Voice Browser without requiring the wholesale modification of either. Rather, the content markup, itself, can act as the coupling agent. Hence, as an example, when a user mouse-clicks on a visual display of a map in a Visual Browser, a co-target tag associated with the map can indicate to a Voice Browser to load and playback audio content associated with the map. Conversely, a Voice Browser can prompt a user to speak the name of a geographic location for which the Voice Browser can audibly provide further information. In response to receiving speech input specifying a geographic location, a co-target tag associated with the voice prompt can indicate to a Visual Browser to load and display a map showing the location of the specified geographic location.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The invention claimed is:

1. A system comprising:
 a central processing unit for processing a presentation of visual content and audio content using:
  a Voice Browser configured to audibly present voice content from a document retrieved from a computer communications network and to identify a reference in the document that specifies visual content for visual presentation; and
  a Visual Browser configured to visually present the visual content,
  wherein the Voice Browser is configured to provide the identified reference to the Visual Browser, and the Visual Browser is configured to retrieve the visual content specified by the identified reference for visual presentation.

2. The system of claim 1, wherein the Voice Browser audibly presents the voice content substantially concurrently with the Visual Browser visual presentation of the visual content.

3. The system of claim 1, wherein the document is a VoiceXML document and the visual content is formatted in HTML.

4. A system comprising:
 a central processing unit for processing a presentation of visual content and audio content using:
  a Visual Browser configured to visually present visual content from a document retrieved from a computer communications network and to identify a reference in the document that specifies voice content for audible presentation; and
  a Voice Browser configured to audibly present the voice content,
  wherein the Visual Browser is configured to provide the identified reference to the Voice Browser, and the Voice Browser is configured to retrieve the voice content specified by the identified reference for audible presentation.

5. The system of claim 4, wherein the Voice Browser audibly presents the voice content substantially concurrently with the Visual Browser visual presentation of the visual content.

6. The system of claim 4, wherein the document is a HTML document and the visual content is formatted in VoiceXML.

* * * * *